(12) United States Patent
Ishii

(10) Patent No.: US 8,891,959 B2
(45) Date of Patent: Nov. 18, 2014

(54) OPTICAL MODULATION DEVICE AND BIAS VOLTAGE CONTROL METHOD

(75) Inventor: Yuji Ishii, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 118 days.

(21) Appl. No.: 13/482,385

(22) Filed: May 29, 2012

(65) Prior Publication Data
US 2013/0028614 A1   Jan. 31, 2013

(30) Foreign Application Priority Data

Jul. 27, 2011   (JP) .................... 2011-164783

(51) Int. Cl.
*H04B 10/08*   (2006.01)

(52) U.S. Cl.
USPC .............. 398/32; 398/198; 398/182

(58) Field of Classification Search
None
See application file for complete search history.

(56) References Cited

U.S. PATENT DOCUMENTS

2004/0013428 A1 *   1/2004   Nakajima et al. ............ 398/43

FOREIGN PATENT DOCUMENTS

JP   2004-56187   2/2004
JP   EP1986353 A1 *   4/2008

* cited by examiner

*Primary Examiner* — Ken Vanderpuye
*Assistant Examiner* — Merlin Brito Peguero
(74) *Attorney, Agent, or Firm* — Staas & Halsey LLP

(57) ABSTRACT

An optical modulation device includes a generating circuit that generates a low-frequency signal, an average value of amplitude as an alternating-current component of the low-frequency signal being different from a center value of the amplitude of the low-frequency signal, a superimposing unit that superimposes the low-frequency signal on a data signal, an optical modulator that modulates, using the superimposition of the low-frequency signal by the superimposing unit, light from a light source and outputs a light signal, a calculating circuit that calculates an amplitude average value and an amplitude center value of a low-frequency component obtained from the light signal output by the optical modulator, and a controller that controls a bias voltage of the optical modulator such that the amplitude average value is brought closer to the amplitude center value of the frequency component calculated by the calculating circuit.

6 Claims, 6 Drawing Sheets

OPTICAL MODULATION DEVICE AND BIAS VOLTAGE CONTROL METHOD

CROSS-REFERENCE TO RELATED APPLICATION

This application is based upon and claims the benefit of priority of the prior Japanese Patent Application No. 2011-164783, filed on Jul. 27, 2011, the entire contents of which are incorporated herein by reference.

FIELD

The embodiments discussed herein are related to an optical modulation device and a bias voltage control method.

BACKGROUND

In recent years, in accordance with an increase in the amount of data transmitted over a network, a higher transmission capacity has been increasingly demanded. In order to achieve an increase in the transmission capacity, an optical modulation device including an optical modulator that is capable of modulating light at high speed is employed. Such an optical modulation device includes an optical modulator, such as an $LiNbO_3$ (LN) modulator that modulates, using a received electric signal, light emitted from a light source, and outputs, as a light signal, the light modulated by the optical modulator.

In optical modulators, for example, due to a variation in the temperature, a variation with time, and the like, periodic characteristics relating to the relationship between the magnitude of the bias voltage of an electric signal input to an optical modulator and the intensity of a light signal output from the optical modulator (hereinafter, referred to as "period characteristics") vary. There is a problem in that a variation in the period characteristics causes the bias voltage of an electric signal input to an optical modulator to be deviated from an optimal value.

Under such circumstances, a technique for automatically controlling the bias voltage of an electric signal to be input to an optical modulator is suggested. FIG. 8 illustrates the configuration of an optical modulation device that automatically controls a bias voltage. The optical modulation device includes a pilot signal generating circuit 11, a data signal generating circuit 12, a pilot signal superimposing unit 13, a laser diode (LD) 14, and an LN modulator 15. The optical modulation device also includes digital analog converters (DACs) 16a and 16b, an optical coupler 17, a photo detector (PD) 18, a current/voltage converter (I/V converter) 19, a band pass filter (BPF) 20, and an analog digital converter (ADC) 21. The optical modulation device also includes a delay circuit 22, a phase comparator 23, a bias voltage controller 24, and a bias voltage applying circuit 25.

A pilot signal having a sinusoidal wave shape and generated by the pilot signal generating circuit 11 is converted, via the DAC 16a, into an analog signal. A data signal generated by the data signal generating circuit 12 is converted, via the DAC 16b, into an analog signal.

A pilot signal is a low-frequency signal having a frequency lower than the frequency of a data signal. The pilot signal from the DAC 16a is superimposed, by the pilot signal superimposing unit 13, on the data signal from the DAC 16b. An input signal that is obtained by superimposing the pilot signal on the data signal is input via the bias voltage applying circuit 25 to the LN modulator 15. The LN modulator 15 modulates, using the input signal, light generated by the LD 14, and outputs the modulated light as a light signal.

The light signal output from the LN modulator 15 is split by the optical coupler 17. The split light is converted, by the PD 18, into a current signal, and then is converted, by the I/V converter 19, into a voltage signal. Then, the voltage signal output from the I/V converter 19 passes through the BPF 20, and a low-frequency component, which is a frequency component having the same frequency as the frequency of the pilot signal is extracted. The low-frequency component extracted by the BPF 20 is converted, by the ADC 21, into a digital signal, and then is input to the phase comparator 23. The low-frequency component extracted by the BPF 20 exhibits a sinusoidal wave shape corresponding to the sinusoidal wave shape of the pilot signal.

The pilot signal generated by the pilot signal generating circuit 11 is converted, via the DAC 16a, into an analog signal. A delay time provided by the delay circuit 22 is added to the analog pilot signal, and the pilot signal including the delay time added thereto is input to the phase comparator 23. The delay time added to the pilot signal corresponds to the time to be taken for processing by the LN modulator 15, the optical coupler 17, the PD 18, the I/V converter 19, the BPF 20, and the ADC 21. In other words, the delay time added to the pilot signal corresponds to the time for compensating for a delay of the low-frequency component extracted by the BPF 20 with respect to the pilot signal.

The phase comparator 23 compares the phase of the pilot signal that has been subjected to the processing of the delay circuit 22 with the phase of the low-frequency component extracted by the BPF 20. The bias voltage controller 24 controls, with reference to the result of the comparison between the phases by the phase comparator 23, the bias voltage to be applied to the data signal by the bias voltage applying circuit 25. That is, the bias voltage controller 24 controls the bias voltage of the input signal to be input to the LN modulator 15 to minimize the low-frequency component extracted by the BPF 20.

Accordingly, by comparing the phase of a pilot signal to be superimposed on a data signal with the phase of a low-frequency component extracted from a light signal and controlling a bias voltage in accordance with the result of the comparison between the phases, the bias voltage may be automatically adjusted to an optimal value so as to follow changes in the period characteristics.

An example of related art is described in Japanese Laid-open Patent Publication No. 2004-056187.

However, the related art for controlling a bias voltage in accordance with the result of the comparison between phases does not take into account control for the bias voltage of a signal to be input to an optical modulator with high speed and high efficiency.

Namely, in the related art, it is presumed that a delay time for compensating for a delay of the low-frequency component extracted from a light signal is added to a pilot signal whose phase is to be compared with the phase of the low-frequency component. Thus, an optical modulation device for which a delay time is not set is not capable of comparing the phase of a pilot signal with the phase of a low-frequency component, and controlling the bias voltage in accordance with the result of the comparison between the phases does not start. As a result, in the related art, high-speed and high-efficiency control for the bias voltage of a signal to be input to an optical modulator may be inhibited.

SUMMARY

According to an aspect of the embodiments, An optical modulation device includes a generating circuit that generates a low-frequency signal, an average value of amplitude as an alternating-current component of the low-frequency signal being different from a center value of the amplitude of the low-frequency signal, a superimposing unit that superimposes the low-frequency signal on a data signal, an optical modulator that modulates, using the superimposition of the low-frequency signal by the superimposing unit, light from a light source and outputs a light signal, a calculating circuit that calculates an amplitude average value and an amplitude center value of a low-frequency component obtained from the light signal output by the optical modulator, and a controller that controls a bias voltage of the optical modulator such that the amplitude average value is brought closer to the amplitude center value of the frequency component calculated by the calculating circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of an optical modulation device and a bias voltage control method disclosed in this application will be explained in detail with reference to the drawings. The present disclosure is not limited to the embodiments described below.

Embodiments

An optical modulation device according to an embodiment includes an optical modulator that modulates, using an input signal obtained by superimposing a pilot signal whose amplitude average value and whose amplitude center value differ from each other on a data signal, light from a light source and outputs the modulated light as a light signal. The optical modulation device controls, in accordance with the amplitude average value and the amplitude center value of a low-frequency component having the same frequency as the frequency of the pilot signal among frequency components of the light signal output from the optical modulator, the bias voltage of the input signal to be input to the optical modulator.

As described above, the optical modulation device controls, in accordance with the amplitude average value and the amplitude center value of the low-frequency component corresponding to the pilot signal among frequency components of the light signal output from the optical modulator, the bias voltage of the input signal to be input to the optical modulator. Thus, the optical modulation device may control the bias voltage of a signal to be input to the optical modulator with high speed and high efficiency, without comparing the phase of the pilot signal with the phase of the low-frequency component.

Figure 1:
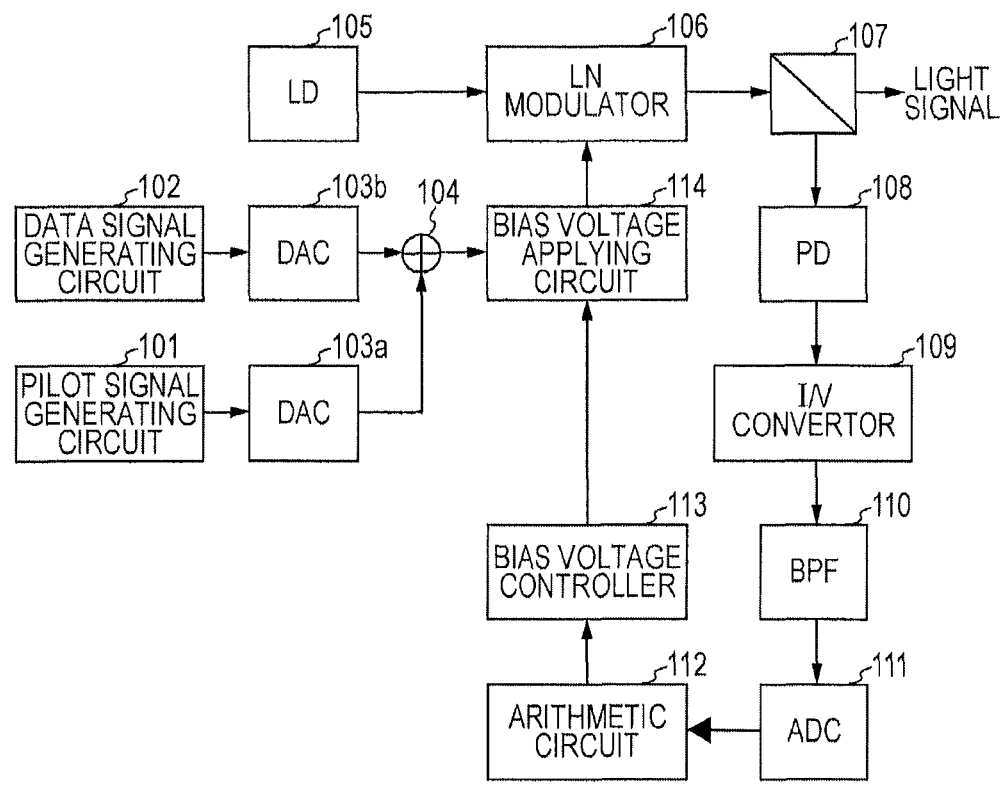
FIG. 1 illustrates the configuration of an optical modulation device according to an embodiment.

FIG. 1 is a functional block diagram illustrating the configuration of an optical modulation device according to an embodiment. The optical modulation device illustrated in FIG. 1 includes a pilot signal generating circuit 101, a data signal generating circuit 102, DACs 103a and 103b, a pilot signal superimposing unit 104, an LD 105, and an LN modulator 106. The optical modulation device illustrated in FIG. 1 also includes an optical coupler 107, a PD 108, an I/V converter 109, a BPF 110, an ADC 111, an arithmetic circuit 112, a bias voltage controller 113, and a bias voltage applying circuit 114.

The pilot signal generating circuit 101 generates a pilot signal. For example, the pilot signal generating circuit 101 generates, as a pilot signal, a low-frequency signal whose frequency is sufficiently lower than the frequency of a data signal generated by the data signal generating circuit 102 and whose amplitude average value and amplitude center value differ from each other.

Figure 2:
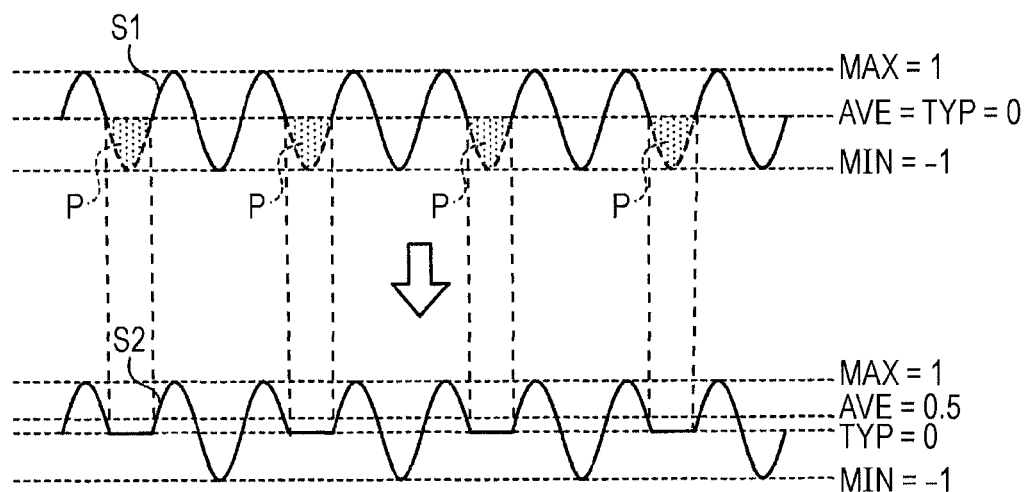
FIG. 2 illustrates generation of a pilot signal by a pilot signal generating circuit.

A specific example of generation of a pilot signal by the pilot signal generating circuit 101 will be explained. FIG. 2 is a diagram for illustrating generation of a pilot signal by the pilot signal generating circuit 101. First, the pilot signal generating circuit 101 generates a sinusoidal wave signal S1, as illustrated in the upper part of FIG. 2. In this example, the maximum value MAX of the amplitude of the sinusoidal wave signal S1 is "1", and the minimum value MIN of the amplitude of the sinusoidal wave signal S1 is "−1". The average value AVE of the amplitude of the sinusoidal wave signal S1 is "0", and the center value TYP of the amplitude of the sinusoidal wave signal S1 is "0". Here, the maximum value MAX of the amplitude of the sinusoidal wave signal S1 may be a value other than "1", and the minimum value MIN of the amplitude of the sinusoidal wave signal S1 may be a value other than "−1". In other words, each of the average value AVE of the amplitude of the sinusoidal wave signal S1 and the center value TYP of the amplitude of the sinusoidal wave signal S1 may be a value other than "0".

The pilot signal generating circuit 101 alternately removes signal portions that are lower than the center of the amplitude of the sinusoidal wave signal S1. For example, the pilot signal generating circuit 101 alternately removes signal portions P, which are represented by shaded portions in the upper part of FIG. 2, of the sinusoidal wave signal S1. For removal of the signal portions P by the pilot signal generating circuit 101, a well-known technique, for example, such as filtering processing or signal synthesis, may be employed.

By alternately removing signal portions that are lower than the center of the amplitude of the sinusoidal wave signal S1, a pilot signal S2 is generated, as illustrated in the lower part of FIG. 2. The center value TYP of the amplitude of the pilot signal S2 is "0". In contrast, the average value AVE of the amplitude of the pilot signal S2 is "0.5", which is greater than the amplitude center value TYP. That is, the pilot signal S2, which is a low-frequency signal whose amplitude average value AVE and whose amplitude center value TYP differ from each other, is generated.

In the example illustrated in FIG. 2, the example in which a pilot signal whose amplitude average value and whose amplitude center value differ from each other is generated by alternately removing signal portions that are lower than the center of the amplitude of a sinusoidal wave signal has been illustrated. However, the method for generating a pilot signal is not limited to this. For example, the pilot signal generating circuit 101 may generate a pilot signal whose amplitude average value and whose amplitude center value differ from each other by alternately removing signal portions that are higher than the center of the amplitude of a sinusoidal wave signal.

Referring back to FIG. 1, the data signal generating circuit 102 generates, as a data signal, an electric signal having a given frequency. The DAC 103a converts the pilot signal generated by the pilot signal generating circuit 101 into an analog signal, and outputs the analog pilot signal to the pilot signal superimposing unit 104. The DAC 103b converts the data signal generated by the data signal generating circuit 102 into an analog signal, and outputs the analog data signal to the pilot signal superimposing unit 104.

The pilot signal superimposing unit 104 superimposes the pilot signal output from the DAC 103a on the data signal output from the DAC 103b, and outputs an electric signal that is obtained by superimposing the pilot signal on the data signal to the LN modulator 106 via the bias voltage applying circuit 114. When the pilot signal is superimposed on the data signal, the pilot signal appears on a high output (H: High) side and a low output (L: Low) side of the electric signal input to the LN modulator 106. Hereinafter, the electric signal obtained by superimposing the pilot signal on the data signal, that is, the electric signal to be input to the LN modulator 106, may be referred to as an "input signal".

The LD 105 is a light source and emits light having a given wavelength. The LN modulator 106 modulates, using the input signal input from the pilot signal superimposing unit 104 via the bias voltage applying circuit 114, the light from the LD 105, and outputs a modulated light signal to the optical coupler 107.

When the input signal is input to the LN modulator 106, a change corresponding to the input signal appears in the light signal output from the LN modulator 106. Namely, since the pilot signal appears on the H side and the L side of the input signal input to the LN modulator 106, a frequency component corresponding to the pilot signal appears on the H side and the L side of the light signal output from the LN modulator 106.

Figure 3:
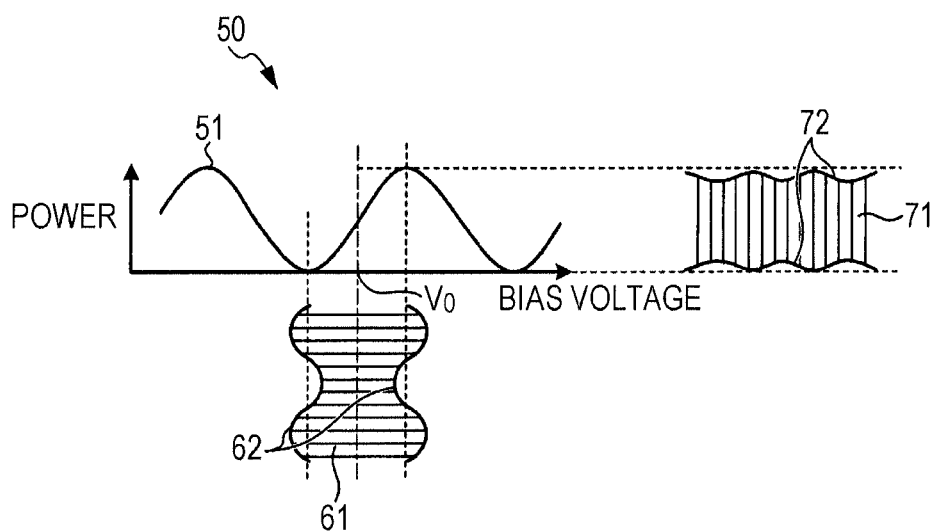
FIG. 3 illustrates the relationship between a light signal output from an LN modulator and an input signal input to the LN modulator.

FIG. 3 is a diagram for illustrating the relationship between the light signal output from the LN modulator 106 and the input signal input to the LN modulator 106. FIG. 3 includes a graph 50. In the graph 50, the abscissa represents the voltage of the input signal input to the LN modulator 106, and the ordinate represents the power of the light signal output from the LN modulator 106. A curved line 51 represents the period characteristics of the LN modulator 106. In the example illustrated in FIG. 3, the bias voltage of the input signal input to the LN modulator 106 is set to an optimal value. Furthermore, in the example illustrated in FIG. 3, for example, an input signal obtained by superimposing a sinusoidal wave pilot signal on a data signal is input to the LN modulator 106.

When an input signal 61 is input to the LN modulator 106, which has the period characteristics represented by the curved line 51 in the graph 50, a light signal 71 is output from the LN modulator 106. In this case, the bias voltage $V_b$ of the input signal 61 is set to an optimal value $V_0$, which is a voltage corresponding to the steepest part of the slope of the curved line 51 exhibiting the period characteristics. Since the input signal 61 is obtained by superposition of a pilot signal 62, a frequency component 72 corresponding to the waveform of the pilot signal 62 appears on the H side and the L side of the light signal 71.

As illustrated in FIG. 3, when the bias voltage $V_b$ of the input signal 61 is set to the optimal value $V_0$, the frequency component 72 has the frequency twice the frequency of the pilot signal 62. Accordingly, when the bias voltage of an input signal input to the LN modulator 106 is set to an optimal value, a frequency component having the frequency twice the frequency of a pilot signal appears in a light signal.

The relationship between the light signal output from the LN modulator 106 and the input signal input to the LN modulator 106 may vary. In other words, the period characteristics of the LN modulator 106 vary. The variation in the period characteristics of the LN modulator 106 is caused by, for example, a variation in the temperature of the optical modulation device, a variation in the optical modulation device with time, and the like. When the period characteristics of the LN modulator 106 vary, the bias voltage of an input signal input to the LN modulator 106 is shifted from an optimal value, resulting in a deterioration of a light signal output from the LN modulator 106. The states where the bias voltage of an input signal input to the LN modulator 106 is shifted from an optimal value are illustrated in FIGS. 4 and 5.

Figure 4:
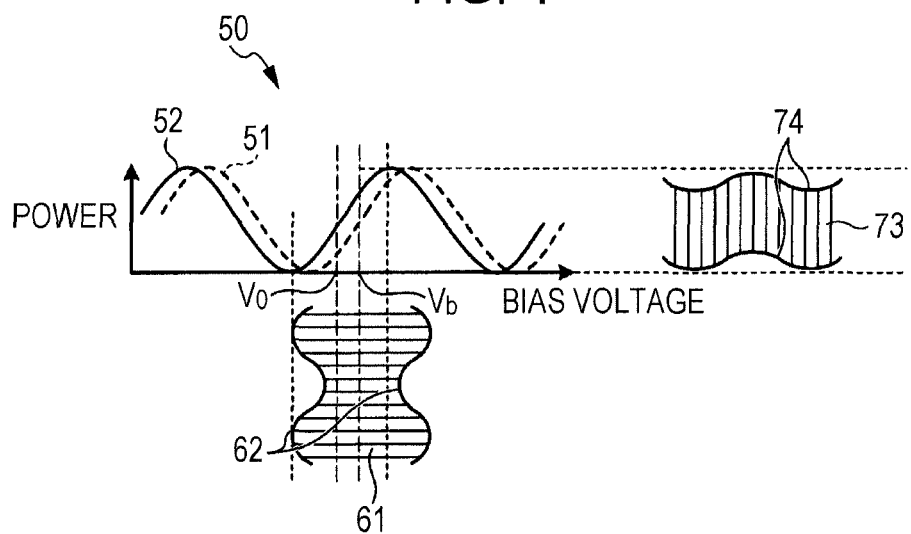
FIG. 4 illustrates the state where the bias voltage of an input signal input to the LN modulator is shifted from an optimal value toward a positive side.

FIG. 4 is a diagram illustrating the state where the bias voltage of an input signal input to the LN modulator 106 is shifted from an optimal value toward the positive side. In the example illustrated in FIG. 4, the period characteristics of the LN modulator 106 represented by the curved line 51 of the graph 50 in FIG. 3 are changed to period characteristics represented by a curved line 52.

When the period characteristics of the LN modulator 106 are changed from the curved line 51 to the curved line 52, the bias voltage $V_b$ of the input signal 61 is shifted from the optimal value $V_0$ toward the positive side, as illustrated in FIG. 4. In this case, a light signal 73 is output from the LN modulator 106. Since the input signal 61 is obtained by superimposition of the pilot signal 62, a frequency component 74 corresponding to the pilot signal 62 appears on the H side and the L side of the light signal 73. As illustrated in FIG. 4, when the bias voltage $V_b$ of the input signal 61 is shifted from the optimal value $V_0$ toward the positive side, the frequency component 74 appearing in the light signal 73 has the same frequency as the frequency of the pilot signal 62.

Figure 5:
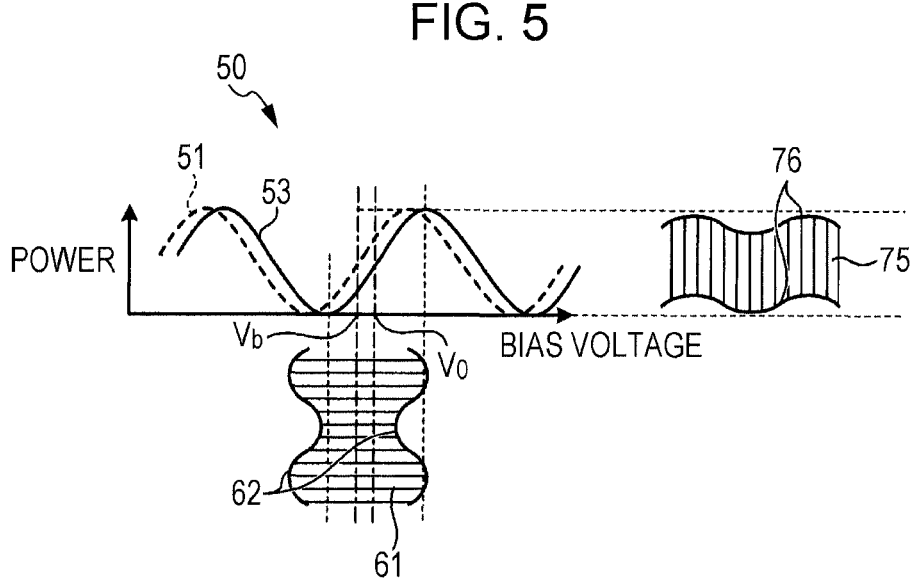
FIG. 5 illustrates the state where the bias voltage of an input signal input to the LN modulator is shifted from an optimal value toward a negative side.

FIG. 5 is a diagram illustrating the state where the bias voltage of an input signal input to the LN modulator 106 is shifted from an optimal value toward the negative side. In the example illustrated in FIG. 5, the period characteristics of the LN modulator 106 represented by the curved line 51 of the graph 50 in FIG. 3 are changed to period characteristics represented by a curved line 53.

When the period characteristics of the LN modulator 106 are changed from the curved line 51 to the curved line 53, the bias voltage $V_b$ of the input signal 61 is shifted from the optimal value $V_0$ toward the negative side, as illustrated in FIG. 5. In this case, a light signal 75 is output from the LN modulator 106. Since the input signal 61 is obtained by superimposition of the pilot signal 62, a frequency component 76 corresponding to the pilot signal 62 appears on the H side and the L side of the light signal 75. As illustrated in FIG. 5, when the bias voltage $V_b$ of the input signal 61 is shifted from the optimal value $V_0$ toward the negative side, the frequency component 76 appearing in the light signal 75 has the same frequency as the frequency of the pilot signal 62. However, the phase of the frequency component 76 appearing in the light signal 75 is inverted with respect to the phase of the frequency component 74 illustrated in FIG. 4.

As described above, when the bias voltage of an input signal input to the LN modulator 106 is shifted from the optimal value, a frequency component having the same frequency as the frequency of a pilot signal appears in a light signal. Furthermore, the phase of a frequency component appearing in a light signal when the bias voltage is shifted from the optimal value toward the positive side and the phase of a frequency component appearing in a light signal when the bias voltage is shifted from the optimal value toward the negative side have an inverse relationship with each other.

Referring back to FIG. 1, the optical coupler 107 splits the light signal output from the LN modulator 106, outputs one of the split light signals to a transmission path, and outputs the other split light signal to the PD 108. The PD 108 converts the light signal received from the optical coupler 107 into a current signal, and outputs the converted light signal, which is a current signal, to the I/V converter 109. The I/V converter 109 converts the light signal received from the PD 108 into a voltage signal, and outputs the converted light signal, which is a voltage signal, to the BPF 110.

The pass band of the BPF 110 is a frequency band allowing transmission of the same frequency as the frequency of a pilot signal. The BPF 110 allows a frequency component having the same frequency as the frequency of the pilot signal to be transmitted among frequency components of the light signal received from the I/V converter 109. For example, when the bias voltage of the input signal input to the LN modulator 106 is shifted from the optimal value, the BPF 110 allows a frequency component having the same frequency as the frequency of the pilot signal to be transmitted among frequency components of the light signal. Then, the BPF 110 outputs the transmitted frequency component to the ADC 111.

In contrast, the BPF 110 blocks a frequency component having a frequency different from the frequency of a pilot signal among the frequency components of a light signal. For example, as illustrated in FIG. 3, when the bias voltage of the input signal input to the LN modulator 106 is set to the optimal value, a frequency component having the frequency twice the frequency of the pilot signal appears in the light signal. In this case, the BPF 110 blocks a frequency component having the frequency twice the frequency of the pilot signal, and does not output a frequency component having the same frequency as the frequency of the pilot signal to the ADC 111.

Figure 6A:
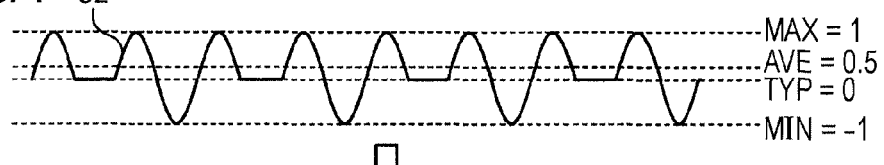
FIGS. 6A to 6C illustrate frequency components output from a BPF.
Figure 6B:
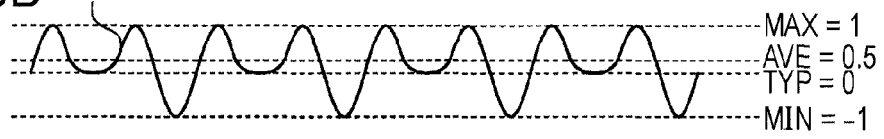
Figure 6C:
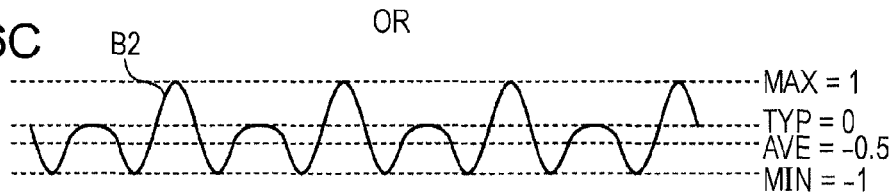

A specific example of frequency components output from the BPF 110 will now be illustrated with reference to FIGS. 6A to 6C. FIGS. 6B and 6C illustrate frequency components output from the BPF 110. FIG. 6A illustrates an example in which a frequency component having the same frequency as the frequency of the pilot signal S2 illustrated in the lower part of FIG. 2 is transmitted though the BPF 110.

As illustrated in FIGS. 6A to 6C, a frequency component B1 or a frequency component B2 that has the same frequency as the frequency of the pilot signal S2 is transmitted through the BPF 110. The amplitude average value AVE of the pilot signal S2 is greater than the amplitude center value TYP of the pilot signal S2. As illustrated in FIG. 6B, the amplitude center value TYP of the frequency component B1 is "0", and the amplitude average value AVE of the frequency component B1 is "0.5". That is, like the pilot signal S2, the amplitude average value AVE of the frequency component B1 is greater than the amplitude center value TYP of the frequency component B1. This means that the bias voltage of the input signal input to the LN modulator 106 is shifted from the optimal value toward the positive side.

In contrast, as illustrated in FIG. 6C, the amplitude center value TYP of the frequency component B2 is "0", and the amplitude average value AVE of the frequency component B2 is "−0.5". That is, on the contrary to the pilot signal S2, the amplitude average value AVE of the frequency component B2 is smaller than the amplitude center value TYP of the frequency component B2. Furthermore, the phase of the frequency component B2 is inverted relative to the phase of the frequency component B1. This means that the bias voltage of the input signal input to the LN modulator 106 is shifted from the optimal value toward the negative side.

Referring back to FIG. 1, the ADC 111 converts a frequency component output from the BPF 110 into a digital signal. For example, the ADC 111 periodically samples values of a frequency component output from the BPF 110 to convert the frequency component into a digital signal. The ADC 111 outputs a digitally converted frequency component to the arithmetic circuit 112. Since the case where no frequency component is output from the BPF 110 means the state where a frequency component having the same frequency as the frequency of a pilot signal is not detected, the ADC 111 outputs "0" to the arithmetic circuit 112.

The arithmetic circuit 112 calculates the amplitude average value AVE and the amplitude center value TYP of a frequency component received from the ADC 111. The arithmetic circuit 112 is an example of a calculating circuit. For example, the arithmetic circuit 112 sequentially reads values of a frequency component periodically received from the ADC 111. Then, the arithmetic circuit 112 extracts the maximum value MAX and the minimum value MIN from the read values of the frequency component.

Then, the arithmetic circuit 112 calculates the amplitude center value TYP of the frequency component using equation (1):

$$\text{Amplitude center value TYP} = (\text{maximum value MAX} - \text{minimum value MIN})/2 \qquad (1)$$

Then, the arithmetic circuit 112 calculates the amplitude average value AVE of the frequency component using equation (2):

$$\text{Amplitude average value AVE} = \text{total sum of values of a frequency component periodically received from the ADC 111/the number of values of the frequency component sampled by the ADC 111} \qquad (2).$$

When "0" is output from the ADC 111, the arithmetic circuit 112 calculates "0" as the amplitude center value TYP and the amplitude average value AVE of the frequency component in accordance with equations (1) and (2).

The bias voltage controller 113 controls the voltage to be applied from the bias voltage applying circuit 114 to the LN modulator 106 in accordance with the amplitude average value AVE and the amplitude center value TYP of the frequency component calculated by the arithmetic circuit 112. The voltage controlled by the bias voltage controller 113 is the bias voltage of the input signal to be input to the LN modulator 106.

For example, the bias voltage controller 113 performs comparison between the amplitude average value AVE and the amplitude center value TYP of the frequency component calculated by the arithmetic circuit 112, and shifts the bias voltage of the input signal to be input to the LN modulator 106 toward the positive side or the negative side in accordance with the result of the comparison. At this time, the bias voltage controller 113 changes the bias voltage of the input signal to be input to the LN modulator 106 by a specific amount.

That is, since the case where the amplitude average value AVE is greater than the amplitude center value TYP means the state where the bias voltage in the LN modulator 106 is shifted from the optimal value toward the positive side, the bias voltage controller 113 reduces the bias voltage of the input signal to be input to the LN modulator 106 by a specific amount. Then, the bias voltage controller 113 determines whether or not each of the amplitude average value AVE and the amplitude center value TYP of the frequency component calculated by the arithmetic circuit 112 exhibits "0".

Then, when each of the amplitude average value AVE and the amplitude center value TYP exhibits "0", the state where a frequency component having the same frequency as the frequency of a pilot signal is not detected and where the bias voltage exhibits the optimal value is entered. Thus, the bias voltage controller 113 terminates the control for the bias voltage.

In contrast, since the case where the amplitude average value AVE is smaller than the amplitude center value TYP means the state where the bias voltage in the LN modulator 106 is shifted from the optimal value toward the negative side, the bias voltage controller 113 increases the bias voltage of the input signal to be input to the LN modulator 106 by a specific amount. Accordingly, the bias voltage controller 113 controls the bias voltage of the input signal until each of the amplitude average value AVE and the amplitude center value TYP exhibits "0".

The bias voltage applying circuit 114 applies the bias voltage controlled by the bias voltage controller 113 to the input signal to be input to the LN modulator 106.

Figure 7:
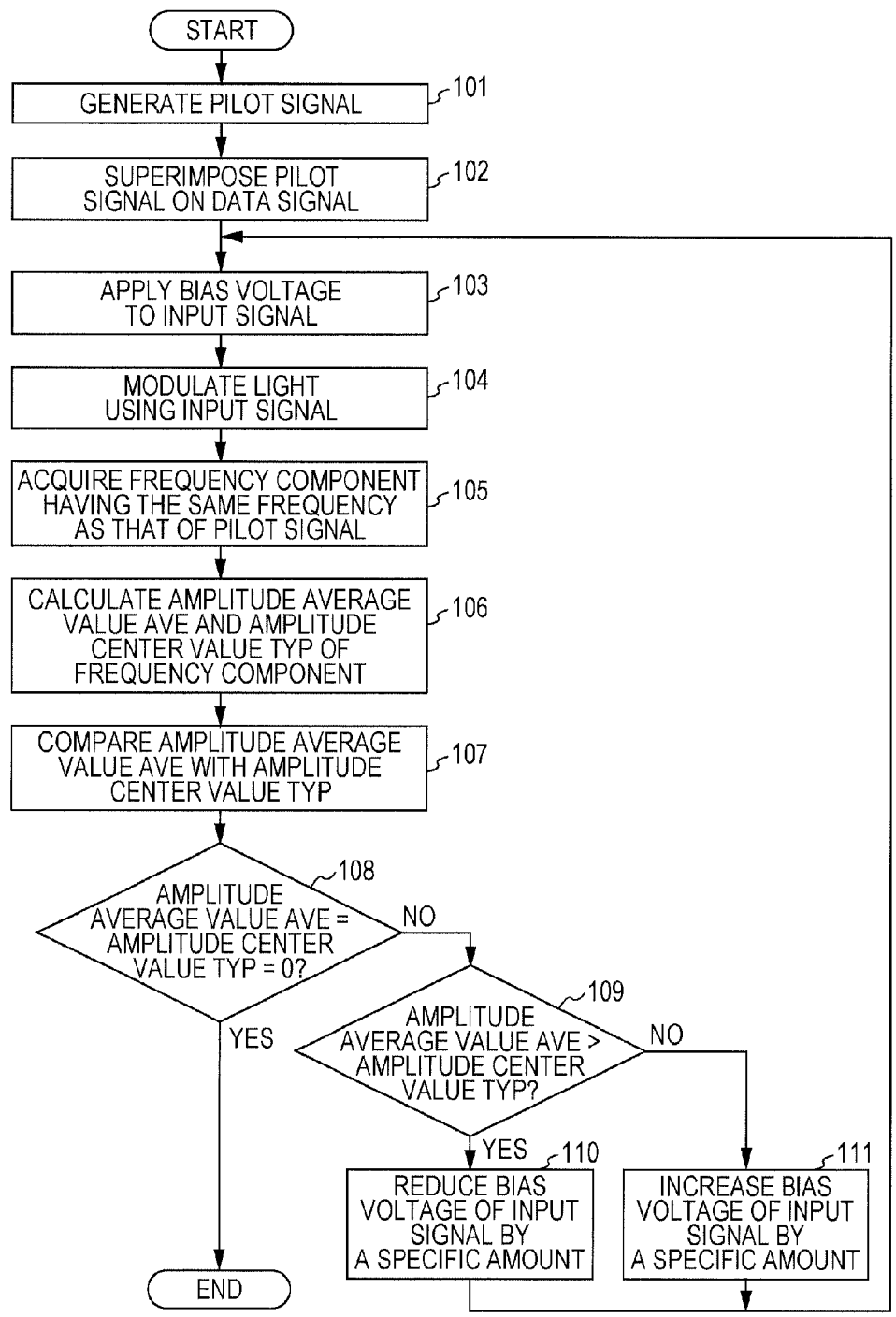
FIG. 7 illustrates operations in a bias voltage control process performed by an optical modulation device according to an embodiment.
Figure 8:
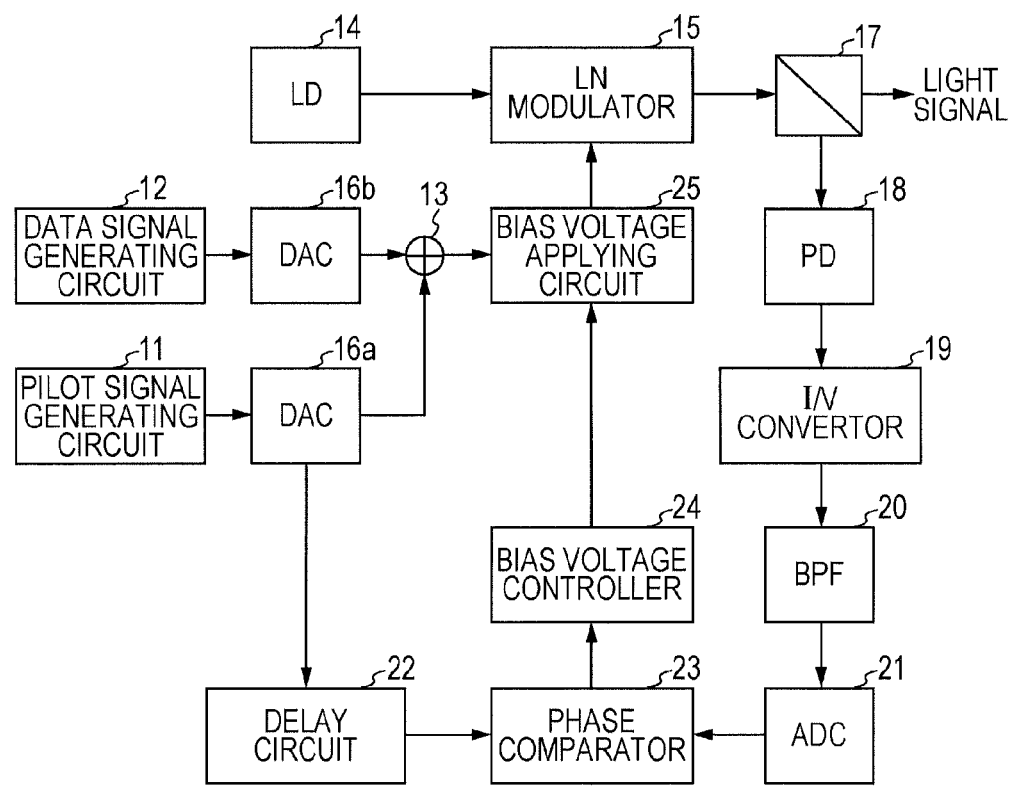
FIG. 8 illustrates the configuration of an optical modulation device that automatically controls the bias voltage of an electric signal to be input to an optical modulator.

A bias voltage control process performed by an optical modulation device according to an embodiment will now be explained. FIG. 7 is a flowchart illustrating operations in a bias voltage control process performed by an optical modulation device according to an embodiment. In FIG. 7, operations in the case where the amplitude average value AVE and the amplitude center value TYP of a frequency component having the same frequency as the frequency of a pilot signal are calculated by the arithmetic circuit 112 and each of the amplitude average value AVE and the amplitude center value TYP is not "0". When each of the amplitude average value AVE and the amplitude center value TYP is "0", since a frequency component having the same frequency as the frequency of a pilot signal is not detected and the bias voltage exhibits an optimal value, bias voltage control is not performed.

As illustrated in FIG. 7, the pilot signal generating circuit 101 generates a pilot signal whose frequency is lower than the frequency of a data signal and whose amplitude average value and amplitude center value differ from each other (operation 101). The pilot signal generated by the pilot signal generating circuit 101 is converted into an analog signal by the DAC 103a, and the converted pilot signal is output to the pilot signal superimposing unit 104.

The pilot signal superimposing unit 104 superimposes the pilot signal on the data signal (operation 102). An input signal obtained by superimposing the pilot signal on the data signal is input to the LN modulator 106 via the bias voltage applying circuit 114. The bias voltage applying circuit 114 applies a bias voltage to the input signal (operation 103).

The LN modulator 106 modulates, using an input signal received from the pilot signal superimposing unit 104 via the bias voltage applying circuit 114, light from the LD 105 (operation 104). The light modulated by the LN modulator 106 is output as a light signal to the optical coupler 107. The light signal is split by the optical coupler 107, and one of the split light signals is output to a transmission path. The other split light signal is output to the PD 108, and the split light signal is converted into a current signal by the PD 108. The light signal, which has been converted into a current signal, is converted into a voltage signal by the I/V converter 109.

The light signal, which has been converted into a voltage signal, is output to the BPF 110, and a frequency component having the same frequency as the frequency of the pilot signal is obtained by the BPF 110 (operation 105). A frequency component having the frequency twice the frequency of the pilot signal is blocked by the BPF 110. The frequency component output from the BPF 110 is digitally converted by the ADC 111, and then is output to the arithmetic circuit 112.

The arithmetic circuit 112 calculates the amplitude average value AVE and the amplitude center value TYP of the frequency component received from the ADC 111 (operation 106). The bias voltage controller 113 performs comparison between the amplitude average value AVE and the amplitude center value TYP of the frequency component calculated by the arithmetic circuit 112 (operation 107).

If each of the amplitude average value AVE and the amplitude center value TYP is "0" (affirmative in operation 108), since a frequency component having the same frequency as the frequency of the pilot signal is not detected and the bias voltage exhibits an optimal value, the bias voltage controller 113 terminates control for the bias voltage. If each of the amplitude average value AVE and the amplitude center value TYP is not "0" (negative in operation 108), the bias voltage controller 113 compares the amplitude average value AVE with the amplitude center value TYP (operation 109).

If the amplitude average value AVE is greater than the amplitude center value TYP (affirmative in operation 109), since the bias voltage is shifted from the optimal value toward the positive side, the bias voltage controller 113 reduces the bias voltage of the input signal to be input to the LN modulator 106 by a specific amount (operation 110). After the bias voltage controller 113 reduces the bias voltage of the input signal to be input to the LN modulator 106 by a specific amount, the process returns to operation 103.

If the amplitude average value AVE is smaller than the amplitude center value TYP (negative in operation 109), since the bias voltage is shifted from the optimal value toward the negative side, the bias voltage controller 113 increases the bias voltage of the input signal by a specific amount (operation 111). After the bias voltage controller 113 increases the bias voltage of the input signal to be input to the LN modulator 106 by a specific amount, the process returns to operation 103.

When the control for the bias voltage is repeatedly performed as described above and each of the amplitude average value AVE and the amplitude center value TYP of the frequency component exhibits "0", a frequency component having the same frequency as the frequency of the pilot signal is not detected, and the bias voltage of an input signal to the LN modulator 106 exhibits an optimal value.

As described above, an optical modulation device according to an embodiment generates a pilot signal whose amplitude average value and amplitude center value differ from each other, and superimposes the generated pilot signal on a data signal. Then, the optical modulation device modulates light from a light source using an input signal obtained by superimposing the pilot signal on the data signal, and outputs an obtained light signal.

Then, the optical modulation device controls, in accordance with the amplitude average value and the amplitude center value of a frequency component having the same frequency as the frequency of the pilot signal among frequency components of the light signal, the bias voltage of an input signal to be input to the LN modulator 106. Accordingly, compared to the related art in which the phase of a pilot signal is compared with the phase of a frequency component, the optical modulation device may control the bias voltage of a signal to be input to the LN modulator 106 with high speed and high efficiency.

An optical modulation device according to an embodiment performs comparison between the amplitude average value and the amplitude center value of a frequency component having the same frequency as the frequency of a pilot signal, and performs control for shifting the bias voltage of a signal to be input to the LN modulator 106 toward the positive side or the negative side in accordance with the result of the comparison. Accordingly, the optical modulation device may detect changes in the period characteristics of the LN modulator 106 by performing simple arithmetic processing, such as comparison between the amplitude average value and the amplitude center value, and may control the bias voltage in the LN modulator 106 at a higher speed.

An optical modulation device according to an embodiment performs control for changing the bias voltage of an input signal to be input to the LN modulator 106 by a specific amount. Accordingly, the optical modulation device may perform closer control for the bias voltage in the LN modulator 106 and may cause the bias voltage in the LN modulator 106 to be closer to an optimal value rapidly.

An optical modulation device according to an embodiment terminates control for a bias voltage when a frequency component having the same frequency as the frequency of a pilot signal is not detected. Accordingly, the optical modulation device may reduce unnecessary power consumption involved in the control for the bias voltage when the bias voltage in the LN modulator 106 is set to an optimal value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical modulation device, comprising: a generating circuit that generates a low-frequency signal, an average value of amplitude as an alternating-current component of the low-frequency signal being different from a center value of the amplitude of the low-frequency signal; a superimposing unit that superimposes the low-frequency signal on a data signal; an optical modulator that modulates, using the superimposition of the low-frequency signal by the superimposing unit, light from a light source and outputs a light signal; a calculating circuit that calculates an amplitude average value and an amplitude center value of a low-frequency component obtained from the light signal output by the optical modulator, when the amplitude average value and the amplitude center value are different; and a controller that controls a bias voltage of the optical modulator such that the amplitude average value is brought closer to the amplitude center value of the frequency component calculated by the calculating circuit.

2. The optical modulation device according to claim 1, wherein the controller performs control for comparing the amplitude average value of the frequency component calculated by the calculating circuit with the amplitude center value of the frequency component calculated by the calculating circuit and changing the bias voltage of the input signal toward a positive side or a negative side in accordance with a result of the comparison.

3. The optical modulation device according to claim 1, wherein the controller performs control for changing the bias voltage of the input signal by a specific amount.

4. The optical modulation device according to claim 1, wherein when a frequency component having the same frequency as the frequency of the low-frequency signal is not detected by the calculating circuit, the controller terminates the control for the bias voltage of the input signal.

5. A bias voltage control method performed by an optical modulation device, comprising: generating a low-frequency signal having a frequency lower than a frequency of a data signal, an average value of amplitude as an alternating-current component of the low-frequency signal being different from a center value of the amplitude of the low-frequency signal; superimposing the generated low-frequency signal on the data signal; modulating, using an input signal, which is an electric signal obtained by superimposing the low-frequency signal on the data signal, light from a light source and outputting a light signal; calculating an amplitude average value and an amplitude center value of a frequency component having the same frequency as the frequency of the low-frequency signal among frequency components of the output light signal, when the amplitude average value and the amplitude center value are different; and controlling the bias voltage of the input signal in such a manner that the calculated amplitude average value of the frequency component is brought closer to the calculated amplitude center value of the frequency component.

6. An optical modulation device, comprising: a generating circuit that generates a low-frequency signal, an average value of amplitude in a time axis as an alternating-current component of the low-frequency signal being different from a center value of the amplitude; a calculating circuit that calculates an amplitude average value in a time axis and an amplitude center value of a low-frequency component obtained from the light signal output by the optical modulator, when the amplitude average value and the amplitude center value are different; and a controller that controls a bias voltage of the optical modulator such that the amplitude average value is brought closer to the amplitude center value of the frequency component calculated by the calculating circuit.

* * * * *